(12) United States Patent
Lim et al.

(10) Patent No.: US 11,685,213 B2
(45) Date of Patent: Jun. 27, 2023

(54) TOP MOUNT ASSEMBLY AND METHOD FOR MANUFACTURING SAME

(71) Applicant: ILJIN CO., LTD., Gyeongju-si Gyeongsangbuk-do (KR)

(72) Inventors: Young No Lim, Gyeongju-si Gyeongsangbuk-do (KR); Se Woong Jeong, Gyeongju-si Gyeongsangbuk-do (KR); Eui Mo Jung, Yongin-si Gyeonggi-do (KR)

(73) Assignee: ILJIN CO., LTD., Gyeongju-si (KR)

( * ) Notice: Subject to any disclaimer, the term of this patent is extended or adjusted under 35 U.S.C. 154(b) by 229 days.

(21) Appl. No.: 16/774,586

(22) Filed: Jan. 28, 2020

(65) Prior Publication Data

US 2020/0164708 A1 May 28, 2020

Related U.S. Application Data

(63) Continuation of application No. PCT/KR2018/008539, filed on Jul. 27, 2018.

(30) Foreign Application Priority Data

Jul. 28, 2017 (KR) .......................... 10-2017-0096053
Nov. 7, 2017 (KR) .......................... 10-2017-0147546

(51) Int. Cl.
*B60G 15/06* (2006.01)
*F16F 1/12* (2006.01)
(Continued)

(52) U.S. Cl.
CPC ............ *B60G 15/068* (2013.01); *F16F 1/127* (2013.01); *B29C 45/14* (2013.01); *B29C 45/72* (2013.01);
(Continued)

(58) Field of Classification Search
CPC ............ B60G 15/068; B60G 2204/128; B60G 2204/418; B29C 45/14; B29C 45/72;
(Continued)

(56) References Cited

U.S. PATENT DOCUMENTS

| 5,248,134 A * | 9/1993 | Ferguson | B60G 15/068 |
| | | | 188/321.11 |
| 2007/0144850 A1* | 6/2007 | Hattori | B60G 11/16 |
| | | | 188/322.16 |
| 2016/0280027 A1* | 9/2016 | Bedeau | B60G 15/068 |

FOREIGN PATENT DOCUMENTS

| DE | 19921695 A1 * | 11/1999 | ........... B60G 15/068 |
| FR | 2949525 A1 * | 3/2011 | ........... B60G 15/067 |

(Continued)

OTHER PUBLICATIONS

Description Translation for KR 10-2017-0025879 from Espacenet (Year: 2017).*

(Continued)

*Primary Examiner* — James A English
*Assistant Examiner* — Daniel M. Keck
(74) *Attorney, Agent, or Firm* — Dinsmore & Shohl LLP; Yongsok Choi, Esq.

(57) ABSTRACT

A top mount assembly includes an insulator coupled to a vehicle body; an upper housing coupled to the insulator; a lower housing coupled to the upper housing; a bearing arranged between the upper housing and the lower housing; an inner seal member comprising a seal frame coupled to the upper end portion of the lower housing in a radially inward direction of the bearing, a seal base portion coupled to the seal frame and a plurality of inner seal lips. The seal frame includes a sleeve coupled to the upper end portion of the upper housing and a flange extending from an upper end of the sleeve in a radially outward direction. The seal base portion is coupled to the flange of the seal frame. The upper (Continued)

end of the inner seal lips is disposed to be spaced apart from the inner sidewall of the upper housing.

15 Claims, 9 Drawing Sheets

(51) Int. Cl.
*B29C 45/14* (2006.01)
*B29C 45/72* (2006.01)
*B29K 105/24* (2006.01)
*B29L 31/30* (2006.01)

(52) U.S. Cl.
CPC ....... *B29K 2105/24* (2013.01); *B29L 2031/30* (2013.01); *B60G 2204/128* (2013.01); *B60G 2204/418* (2013.01)

(58) Field of Classification Search
CPC .. B29K 2105/24; B29L 2031/721; F16F 1/12; F16F 1/127
See application file for complete search history.

(56) References Cited

FOREIGN PATENT DOCUMENTS

| JP | H09303474 A | | 11/1997 |
|---|---|---|---|
| JP | 2005299737 A | * | 10/2005 |
| KR | 20160059092 A1 | * | 5/2016 |
| KR | 1020160050435 A | | 5/2016 |
| KR | 1020160105070 A | | 9/2016 |
| KR | 1020170004772 A | | 1/2017 |
| KR | 1020170025879 A | | 8/2017 |
| KR | 102350737 B1 | * | 6/2020 |

OTHER PUBLICATIONS

Description Translation for JP H09303474 from Espacenet (Year: 1997).*
International Search Report for PCT/KR2018/008539 dated Dec. 27, 2018.

* cited by examiner

TOP MOUNT ASSEMBLY AND METHOD FOR MANUFACTURING SAME

CROSS-REFERENCE TO RELATED APPLICATIONS

This application is a continuation of International Patent Application No. PCT/KR2018/008539 filed on Jul. 27, 2018 which claims priority to Korean Patent Application No. 10-2017-0096053 filed on Jul. 28, 2017 and Korean Patent Application No. 10-2017-0147546 filed on Nov. 7, 2017, the entire contents of which are herein incorporated by reference.

TECHNICAL FIELD

The present disclosure relates to a top mount assembly and a method of manufacturing the same.

BACKGROUND ART

A suspension system of a vehicle is a system which supports a weight of a vehicle body and reduces a vertical vibration of a wheel to improve ride comfort, prevent damage to a cargo due to an impact, and prevent an excessive load from acting on each part. A front suspension system of an individual suspension type includes a wishbone type suspension system and a McPherson type suspension system. A McPherson type suspension system is widely used in a passenger car due to a simplified structure and low cost as compared to a wishbone type suspension system.

A strut having a shock absorber embedded therein and a coil spring provided thereoutside is employed in a McPherson type suspension system. An upper end of the strut is coupled to a vehicle body through a top mount assembly and a lower end thereof is coupled to a knuckle. The strut is configured to be rotated relative to the vehicle body according to steering of the wheel. The top mount assembly comprises an insulator having an outer surface made of a rubber material and a strut bearing press-fitted into the insulator. The insulator comprises a steel insert embedded in the insulator so as to prevent the strut bearing from being easily separated from the insulator. The strut bearing comprises an upper housing, a lower housing which is rotated relative to the upper housing, and a bearing disposed between the upper housing and the lower housing. Further, in order to prevent foreign materials such as dust or water from being introduced into the bearing, the strut bearing comprises a seal member installed between the upper housing and the lower housing in a radially inward direction and a radially outward direction of the strut hearing.

SUMMARY

Technical Problem

Since a conventional seal member installed in the lower housing in the radially inward direction of the strut bearing is always in contact with an inner outer circumferential surface of the upper housing, when the upper housing is rotated relative to the lower housing, a rotational torque or rotational resistance acting between the seal member and the upper housing is increased.

The present disclosure is directed to providing a top mount assembly and a method of manufacturing the same, which reduce a rotational torque or rotational resistance between the inner seal member and the upper housing while providing excellent seal performance in the radially inward direction.

Technical Solution

One aspect of the present disclosure provides a top mount assembly. The top mount assembly according to one embodiment may comprise an insulator coupled to a vehicle body, an upper housing integrally coupled to the insulator below the insulator, a lower housing coupled to the upper housing, a bearing disposed between the upper housing and the lower housing, an inner seal member comprising a seal frame coupled to an upper end portion of the lower housing in a radially inward direction of the bearing, a seal base portion coupled to the seal frame, and a plurality of inner seal lips extending upward from the seal base portion. The seal frame may comprise a sleeve coupled to the upper end portion of the lower housing and a flange extending from an upper end of the sleeve in a radially outward direction. The seal base portion may be coupled to the flange of the seal frame. The upper end of the inner seal lips may be disposed to be spaced apart from an inner sidewall of the upper housing and to be in contact with a lower surface of the upper housing.

In one embodiment, a groove which is concave upward may be formed on the lower surface of the upper housing. The upper end of the inner seal lips may be disposed to be spaced apart from the inner sidewall of the groove and to be in contact with a bottom wall of the groove.

In one embodiment, a width of the groove in a radial direction may correspond to a width of the seal base in the radial direction.

In one embodiment, the sleeve may be press fitted to an inner circumferential surface of the upper end portion of the lower housing.

In one embodiment, the flange may protrude from an outer circumferential surface of the upper end portion of the lower housing in the radially outward direction.

In one embodiment, the seal base portion may be coupled to the seal frame to surround an upper surface of the flange, a radial outer end of the flange, and a portion of a lower surface of the flange.

In one embodiment, the upper housing nay be integrally coupled to the insulator by insert vulcanizing.

In one embodiment, the upper housing may comprise a plurality of concave portions intermittently disposed on an upper surface thereof in a circumferential direction.

In one embodiment, the upper housing may comprise at least one of an inner flange extending from an inner circumferential surface thereof in the radially inward direction and an outer flange extending from an outer circumferential surface thereof in the radially outward direction.

In one embodiment, the top mount assembly may further comprise a spring pad frame integrally coupled to the lower housing.

In one embodiment, the top mount assembly may further comprise a spring pad integrally coupled to the spring pad frame at the outside of the spring pad frame.

In one embodiment, at least a portion of the spring pad may be disposed between the upper housing and the lower housing in the radially outward direction of the bearing to seal between the upper housing and the lower housing.

In one embodiment, the spring pad may comprise a seat part extending in the radially outward direction, and a plurality of outer seal lips integrally formed with the seat part thereon and configured to seal between the upper housing and the lower housing.

Another aspect of the present disclosure provides a method of manufacturing a top mount assembly. The method of manufacturing a top mount assembly according to one embodiment may comprise manufacturing an upper housing, manufacturing an insulator which is integrally coupled to the upper housing, manufacturing a lower housing coupled to the upper housing, manufacturing an inner seal member comprising a seal frame coupled to an upper end portion of the lower housing, a seal base portion coupled to the seal frame and a plurality of inner seal lips extending upward from the seal base portion, coupling the inner seal member to the upper end portion of the lower housing, arranging a bearing between the upper housing and the lower housing in a radially outward direction of the inner seal member, and coupling the lower housing to the upper housing. The seal frame may comprise a sleeve coupled to the upper end portion of the lower housing and a flange extending from an upper end of the sleeve in a radially outward direction. In the manufacturing of the inner seal member, the seal base portion may be coupled to the flange and the upper end of the inner seal lips may be disposed to be spaced apart from an inner sidewall of the upper housing and to be in contact with a lower surface of the upper housing.

In one embodiment, a groove which is concave upward may be formed on the lower surface of the upper housing. The upper end of the inner seal lips may be disposed to be spaced apart from the inner sidewall of the groove and to be in contact with a bottom wall of the groove.

In one embodiment, a width of the groove in a radial direction may correspond to a width of the seal base portion in the radial direction.

In one embodiment, in the coupling of the inner seal member to the upper end portion of the lower housing, the sleeve may be press fitted to an inner circumferential surface of the upper end portion of the lower housing.

In one embodiment, in the manufacturing of the inner seal member, the flange may protrude from an outer circumferential surface of the upper end portion of the lower housing in the radially outward direction.

In one embodiment, in the manufacturing of the inner seal member, the seal base portion may be coupled to the seal frame to surround an upper surface of the flange, a radial outer end of the flange, and a portion of a lower surface of the flange.

In one embodiment, in the manufacturing of the insulator, the insulator may be manufactured to be integrally coupled to the upper housing by insert vulcanizing.

In one embodiment, the method of manufacturing a top mount assembly may further comprise insert vulcanizing a spring pad frame which is integrally coupled to the lower housing.

In one embodiment, the method of manufacturing a top mount assembly may further comprise insert vulcanizing a spring pad to be integrally coupled to the spring pad frame at the outside of the spring pad frame.

Advantageous Effects

In accordance with a top mount assembly and a manufacturing method thereof according to embodiments, an inner seal member are disposed between an upper housing and a lower housing and thus excellent seal performance can be obtained. Further, since the inner seal member comprises a seal frame coupled to an upper end portion of the lower housing, a seal base portion coupled to a flange of the seal frame, and a plurality of inner seal lips extending upward from the seal base portion, a rotational torque or rotational resistance between the upper housing and the inner seal member can be reduced.

DETAILED DESCRIPTION

Figure 1:
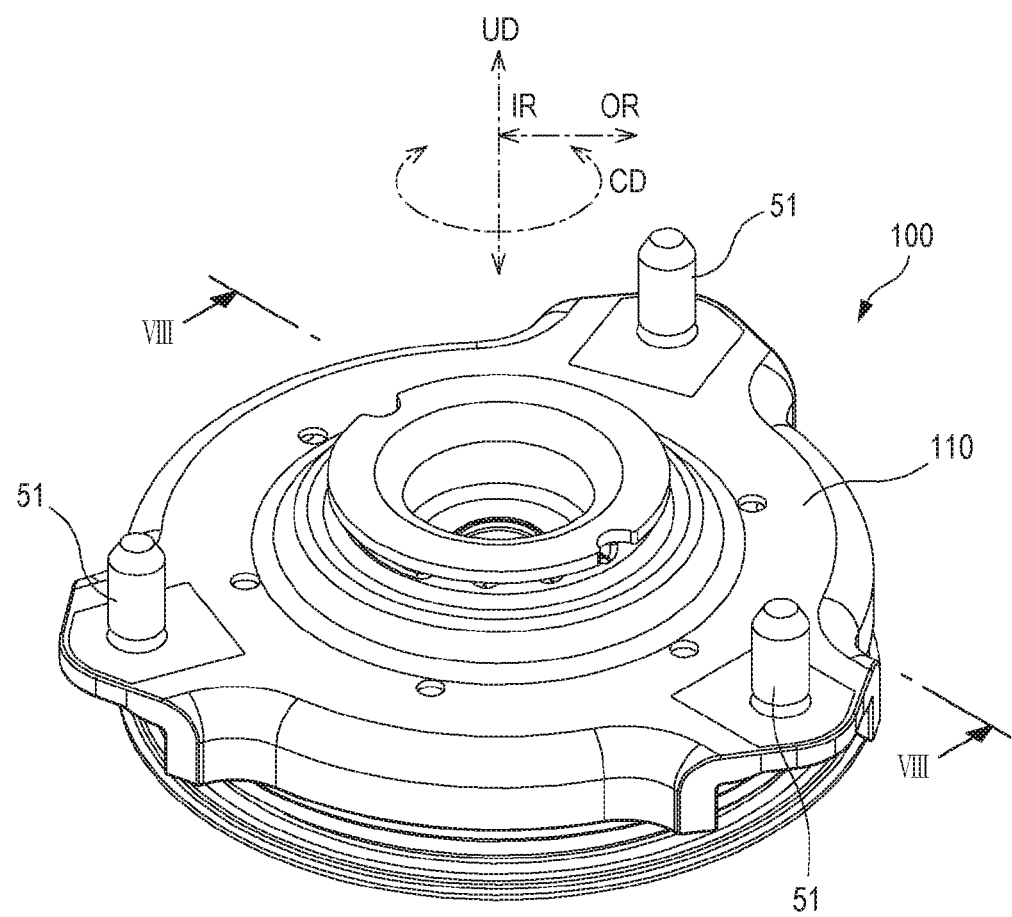
FIG. 1 is a perspective view illustrating a top mount assembly according to one embodiment of the present disclosure.

Embodiments of the present disclosure are exemplified for the purpose of describing the technical spirit of the present disclosure. The scope of the claims according to the present disclosure is not limited to the embodiments described below or to the detailed descriptions of these embodiments.

Unless otherwise defined, all technical and scientific terms used herein have the same meaning commonly understood by those skilled in the art to which the present disclosure pertains. All terms used herein are selected for the purpose of more clearly describing the present disclosure and not limiting the scope of the present disclosure defined by appended claims.

Unless the phrase or sentence clearly indicates otherwise, terms "comprising," "including," "having," "taking," and the like used herein should be construed as open-ended terms encompassing the possibility of including other embodiments.

The singular form described herein may include the plural form unless the context clearly dictates otherwise, and this is equally applied to the singular form set forth in the claims.

Direction indicating terms such as "upward," "on," "above," and the like used herein are based on a direction in which an insulator is located with respect to a lower housing in the accompanying drawings, and direction indicating terms "downward," "under," "below," and the like mean a direction opposite to the direction of the direction indicating terms such as "upward," "on," "above," and the like. The insulator and the lower housing shown in the accompanying drawings may be oriented differently, and these direction indicating terms may be construed accordingly. A direction indicating term "radially outward direction" used herein means a direction away from an axis in a radial direction with respect to an axis of a rotating body, and a direction indicating term "radially inward direction" means a direction opposite to the radially outward direction.

Hereinafter, exemplary embodiments of the present disclosure will be described with reference to the accompanying drawings. In the accompanying drawings, the same reference numerals are assigned to the same or corresponding components. Further, in the following description of the embodiments, duplicate descriptions on the same or corresponding components may be omitted. However, even though a description of a component is omitted, such a component is not intended to be excluded in any embodiment.

Figure 2:
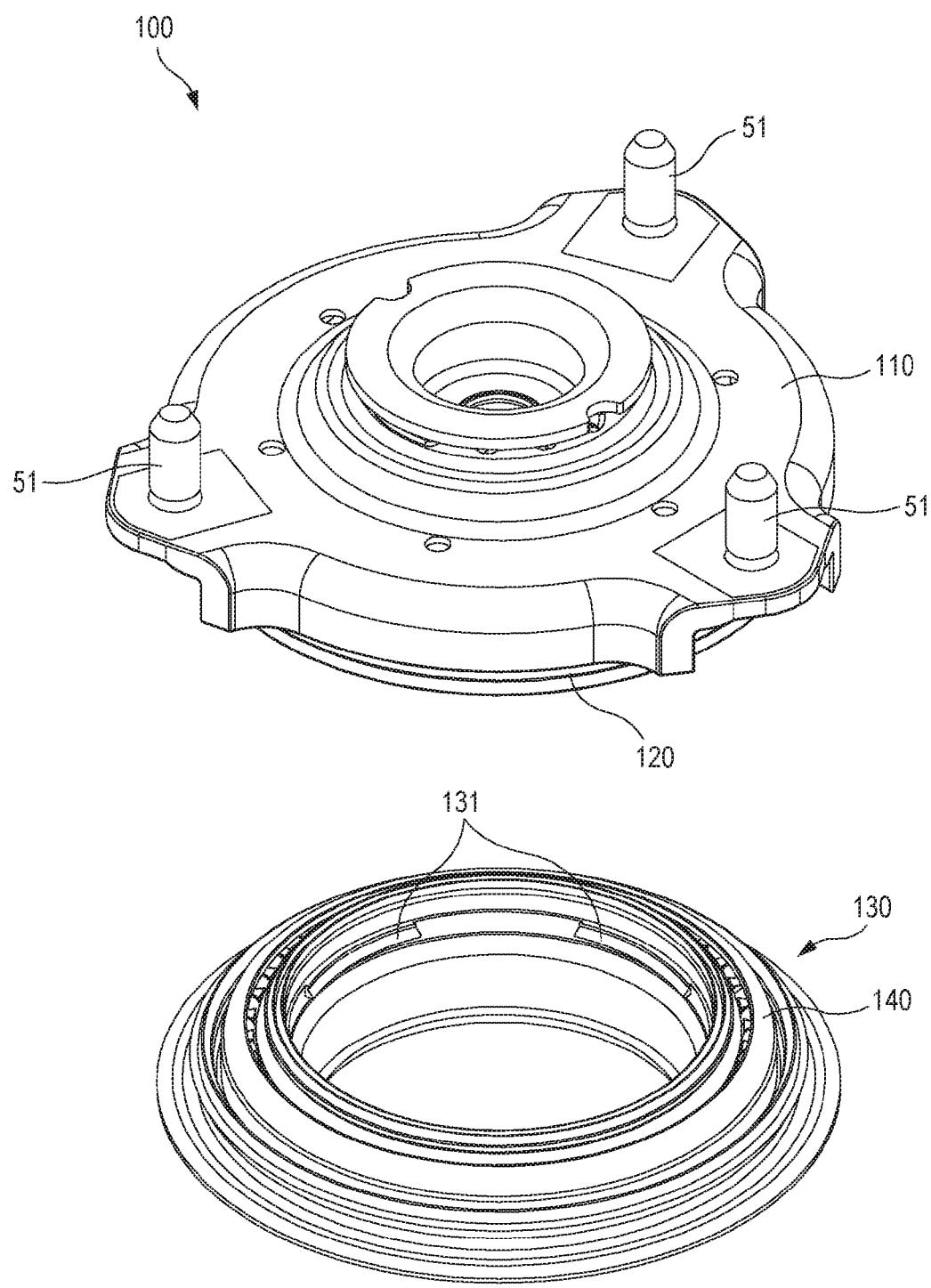
FIG. 2 is an exploded perspective view illustrating the top mount assembly shown in FIG. 1.

FIG. 1 is a perspective view illustrating a top mount assembly according to one embodiment of the present disclosure. FIG. 2 is an exploded perspective view illustrating the top mount assembly shown in FIG. 1.

As shown in FIGS. 1 and 2, the top mount assembly 100 according to one embodiment of the present disclosure comprises an insulator 110, an upper housing 120, a lower housing 130, a bearing 140, and an inner seal member 150. The top mount assembly 100 is coupled to an upper end of a strut and serves to reduce a transfer of an impact or a vibration between the strut and a vehicle body. The upper housing 120, the lower housing 130, the bearing 140 and the inner seal member 150 may be understood as components forming a strut bearing.

The insulator 110 may comprise an insert 111 and an elastic body 112. A central portion of the insulator 110 is coupled to the strut and a radially outside portion thereof is coupled to the vehicle body through a plurality of bolts 51.

Figure 3:
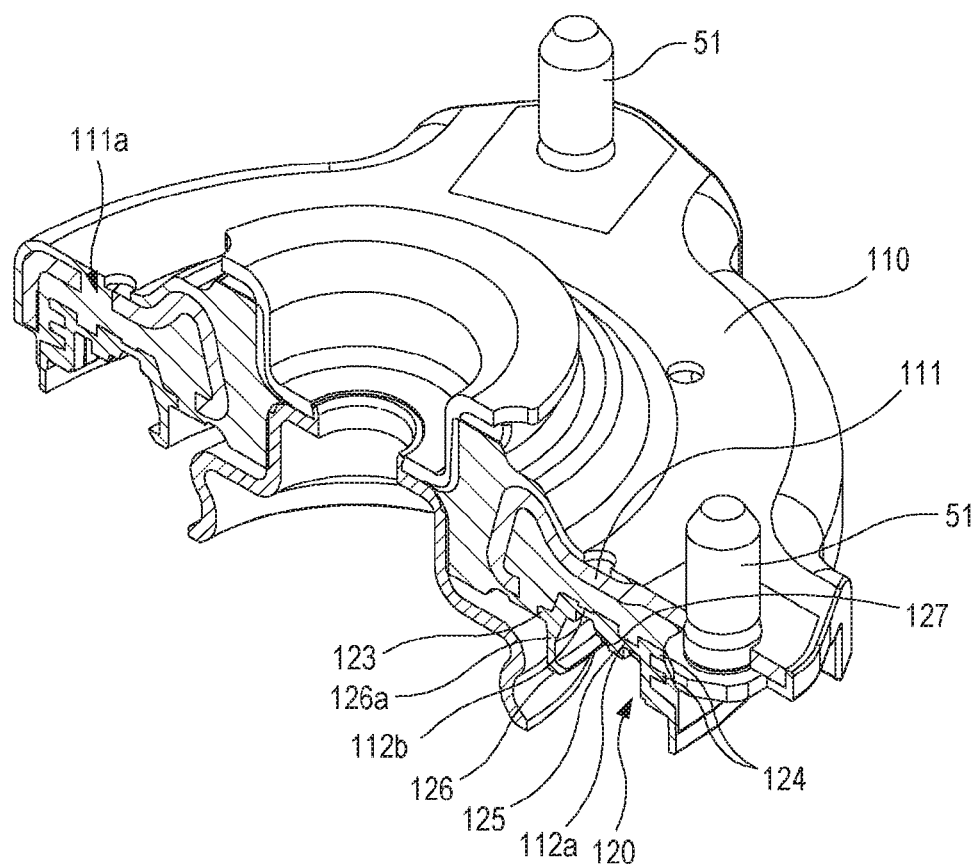
FIG. 3 is a cross-sectional perspective view illustrating an insulator and an upper housing shown in FIG. 2.

FIG. 3 is a cross-sectional perspective view illustrating the insulator and the upper housing shown in FIG. 2.

As shown in FIG. 3, the insert 111 serves to form a frame of the insulator 110 and reinforce rigidity of the insulator 110. The insert 111 may be made of a metal sheet, e.g., a high-tension steel plate. The insert 111 may be completely embedded in the elastic body 112. In other words, the elastic body 112 may be formed to completely surround the insert 111. In one embodiment, the insert 111 may comprise a plurality of holes 111a disposed in a circumferential direction CD, and the elastic body 112 may be formed to pass through the holes 111a. As a result, a coupling force between the insert 111 and the elastic body 112 may be enhanced.

The elastic body 112 integrally couples the insert 111 to the upper housing 120. The elastic body 112 is disposed between the vehicle body and the insert 111 to prevent the insert 111 from being in direct contact with the vehicle body. Thus, the elastic body 112 partially absorbs an impact or a vibration transferred from the strut. For example, the elastic body 112 may be made of a rubber material. The elastic body 112 may be manufactured in a predetermined shape by vulcanizing. In one embodiment, the insulator 110 may be manufactured by vulcanizing the elastic body 112 in a state in which the insert 111 and the upper housing 120 are fixed to a mold so as to be spaced apart from each other. Here, curing or vulcanization refers to an operation of changing elasticity by heating raw rubber.

Figure 4:
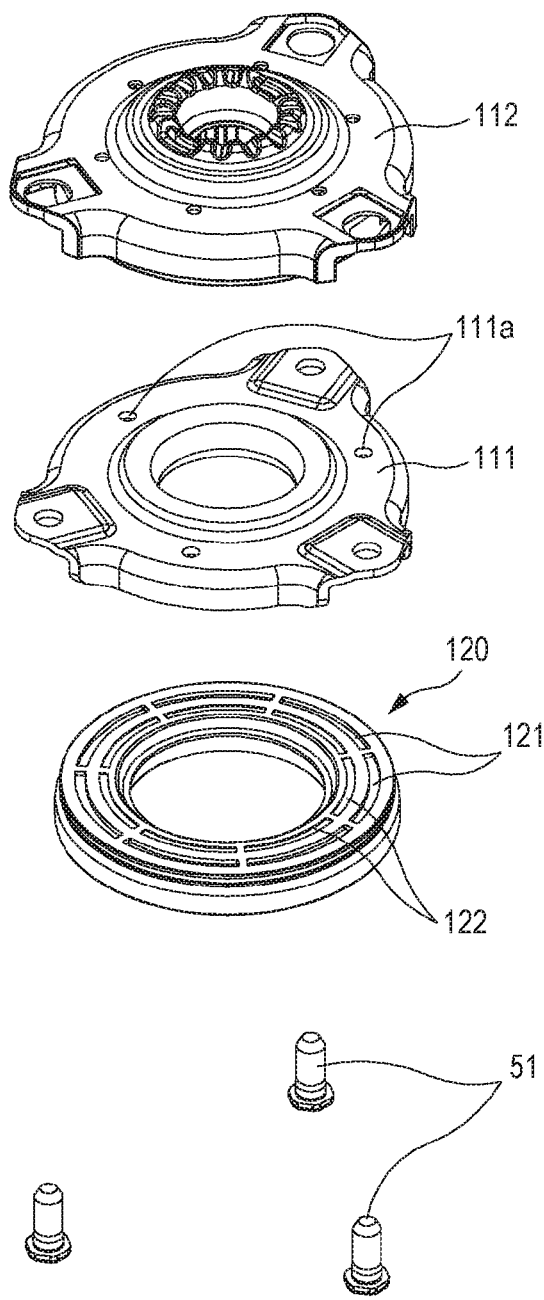
FIG. 4 is an exploded perspective view illustrating the insulator and the upper housing shown in FIG. 3.

FIG. 4 is an exploded perspective view illustrating the insulator and the upper housing shown in FIG. 3.

In one embodiment, the upper housing 120 may comprise a plurality of first concave portions 121 intermittently arranged (i.e., disposed to be spaced apart from each other) on an upper surface thereof in the circumferential direction CD, as shown in FIG. 4. Further, the upper housing 120 may comprise a plurality of second concave portions 122 which are spaced apart from the plurality of first concave portions in the radial direction IR or OR and intermittently arranged each other (i.e., disposed to be spaced apart from each other). The concave portions may be arranged in a plurality of columns in the radial direction IR or OR. For example, the upper housing 120 may comprise any one among the plurality of first concave portions 121 and the plurality of second concave portions 122. Alternatively, the upper housing 120 may comprise both the plurality of first concave portions 121 and the plurality of second concave portions 122.

Figure 5:
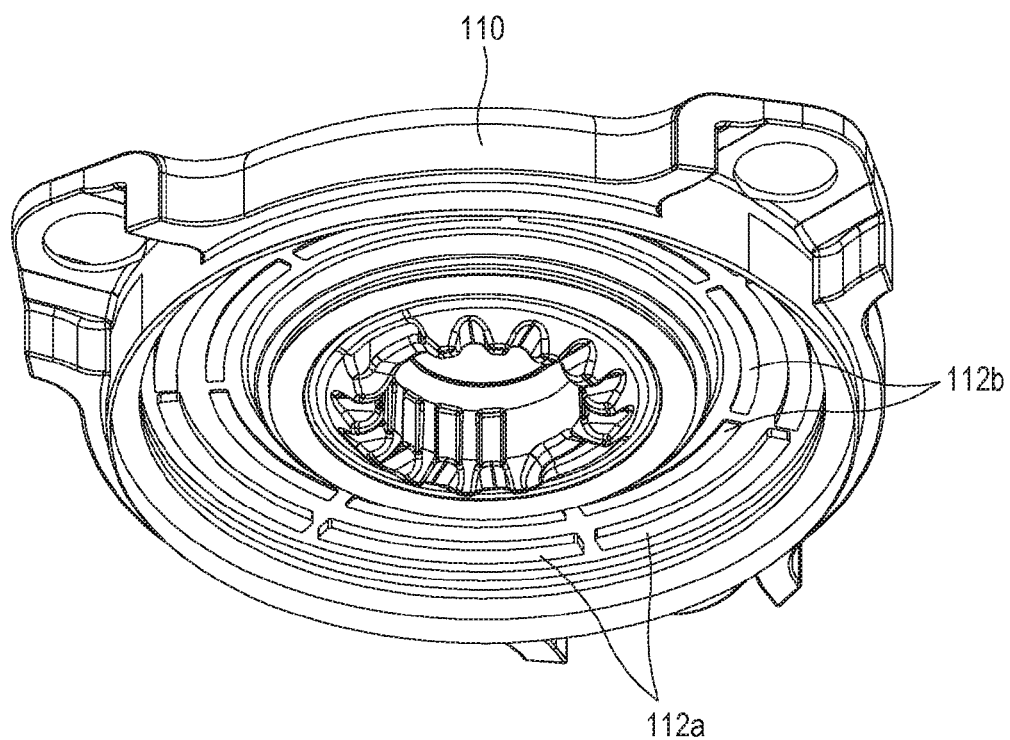
FIG. 5 is a perspective view illustrating a lower surface of an elastic body shown in FIG. 4.

FIG. 5 is a perspective view illustrating a lower surface of an elastic body shown in FIG. 4.

In one embodiment, the elastic body 112 may comprise a plurality of first protrusions 112a filling in the plurality of first concave portions 121 and intermittently arranged in the circumferential direction CD, as shown in FIG. 5. Further, the elastic body 112 may comprise a plurality of second protrusions 112b filling in the plurality of second concave portions 122, spaced apart from the plurality of first protrusions 112a in the radial direction IR or OR and intermittently arranged. The protrusions may be arranged in a plurality of columns in the radial direction IR or OR. For example, the elastic body 112 may comprise any one among the plurality of first protrusions 112a and the plurality of second protrusions 112b. Alternatively, the elastic body 112 may comprise both the plurality of first protrusions 112a and the plurality of second protrusions 112b.

Owing to a mutual coupling between the first and second protrusions 112a and 112b of the elastic body 112 and the first and second concave portions 121 and 122 of the upper housing 120, an area in which the elastic body 112 comes into contact with the upper housing 120 is increased and thus a coupling force between the elastic body 112 (i.e., the insulator 110) and the upper housing 120 may be enhanced. Further, since the first protrusions 112a of the elastic body 112 and the first concave portions 121 of the upper housing 120 are intermittently arranged in the circumferential direction CD, relative movement between the elastic body 112 and the upper housing 120 in the circumferential direction CD may be suppressed or prevented. Furthermore, since the second protrusions 112b of the elastic body 112 and the second concave portions 122 of the upper housing 120 are intermittently arranged in the radial direction IR or OR, relative movement between the elastic body 112 and the upper housing 120 in the radial direction IR or OR may be also suppressed or prevented.

The first and second protrusions 112a and 112b may be manufactured together with the elastic body 112 by filling a material of the elastic body 112 in a mold used for forming the elastic body 112 and a protrusion space formed by the first and second concave portions 121 and 122 of the upper housing 120. Owing to the above-described configurations of the elastic body 112 and the upper housing 120, the upper housing 120 may be integrally coupled to the elastic body 112. Accordingly, the insulator 110 does not need to have a steel insert for holding and supporting the bearing 140, and thus it is possible to achieve a weight reduction of the top mount assembly 100. Further, the manufacturing of the insulator 110 and the coupling of the insulator 110 and the upper housing 120 may be simultaneously achieved in one process by, for example, vulcanizing the elastic body 112 in a state in which the insert 111 and the upper housing 120 are disposed in the mold. Consequently, a manufacturing process of the top mount assembly 100 may be simplified.

In one embodiment, the upper housing 120 may comprise at least one of an inner flange 123 extending from an inner circumferential surface thereof in the radially inward direction IR and an outer flange 124 extending from an outer circumferential surface thereof in the radially outward direction OR. For example, the upper housing 120 may comprise both the inner flange 123 and the outer flange 124. Alternatively, the upper housing 120 may comprise either the inner flange 123 or the outer flange 124. The inner flange 123 may comprise a plurality of inner flanges arranged to be spaced apart from each other in a vertical direction UD. The outer flange 124 may comprise a plurality of outer flanges arranged to be spaced apart from each other in the vertical direction UD. Owing to the configuration of the inner flange 123 or the outer flange 124 of the upper housing 120, an area in which the elastic body 112 is in contact with the upper housing 120 is increased. Consequently, a coupling force between the elastic body 112 and the upper housing 120 may be enhanced. Further, relative movement between the upper housing 120 and the elastic body 112 in the vertical direction UD may be suppressed or prevented.

In one embodiment, the upper housing 120 may comprise an extension 125 extending downward (in a downward direction) to be in contact with an upper portion of the bearing 140. The extension 125 may pressurize the bearing 140 downwardly toward the lower housing 130 in a state in which the upper housing 120 is coupled to the lower housing 130. Accordingly, the bearing 140 may be held and supported at a predetermined position between the upper housing 120 and the lower housing 130.

In one embodiment, the upper housing 120 may comprise upper hook 126 for coupling with the lower housing 130. The upper hook 126 protrudes from an outer circumferential surface of a cylindrical part 126a formed in an inner circumferential portion of the upper housing 120 in the radially outward direction OR. A plurality of upper hooks 126 may be intermittently formed in the circumferential direction. Alternatively, the upper hook may be continuously formed in the circumferential direction.

In one embodiment, a groove 128 (see FIG. 9) which is concave upward (in the upward direction) may be formed on a lower surface 127 of the upper housing 120. At least a portion of the inner seal member 150 is accommodated in the groove 128. A foreign material inflow path between the upper housing 120 and the lower housing 130 extends in the radially inward direction IR so that it is possible to improve seal performance between the upper housing 120 and the lower housing 130. The groove 128 comprises an inner sidewall 128a located in the radially inward direction IR and a bottom wall 128b parallel to the lower surface 127. The inner sidewall 128a may be understood as an inner sidewall of the upper housing 120.

Figure 6:
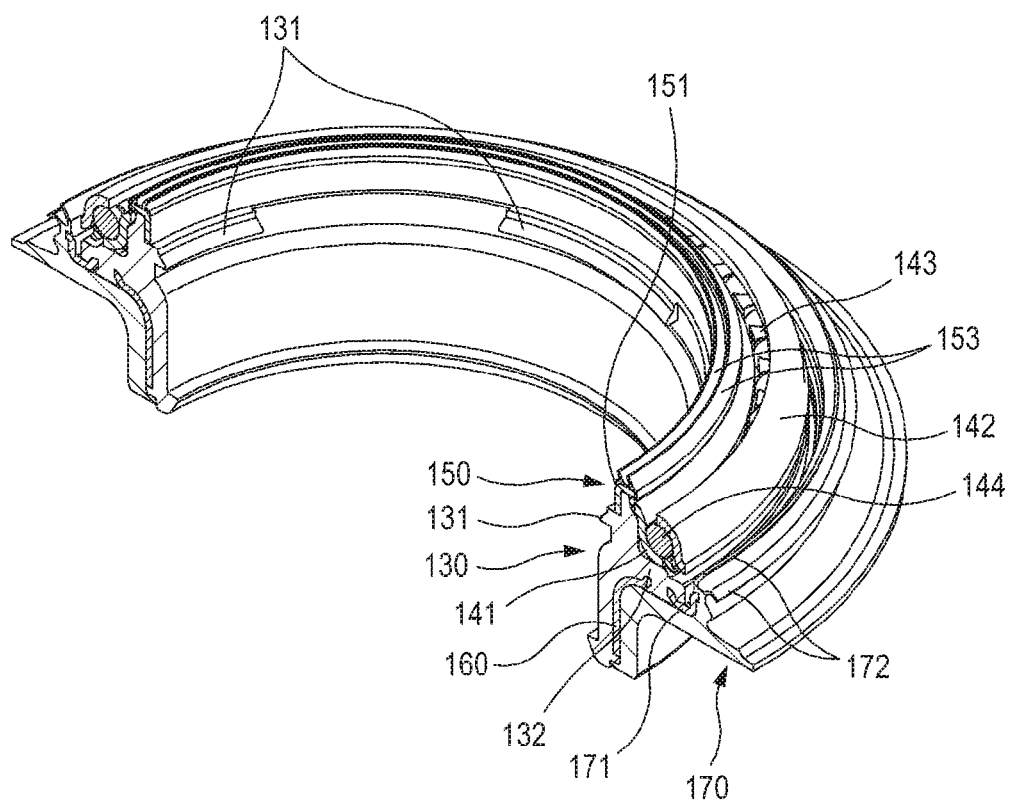
FIG. 6 is a cross-sectional perspective view illustrating a lower housing and a bearing shown in FIG. 2.
Figure 7:
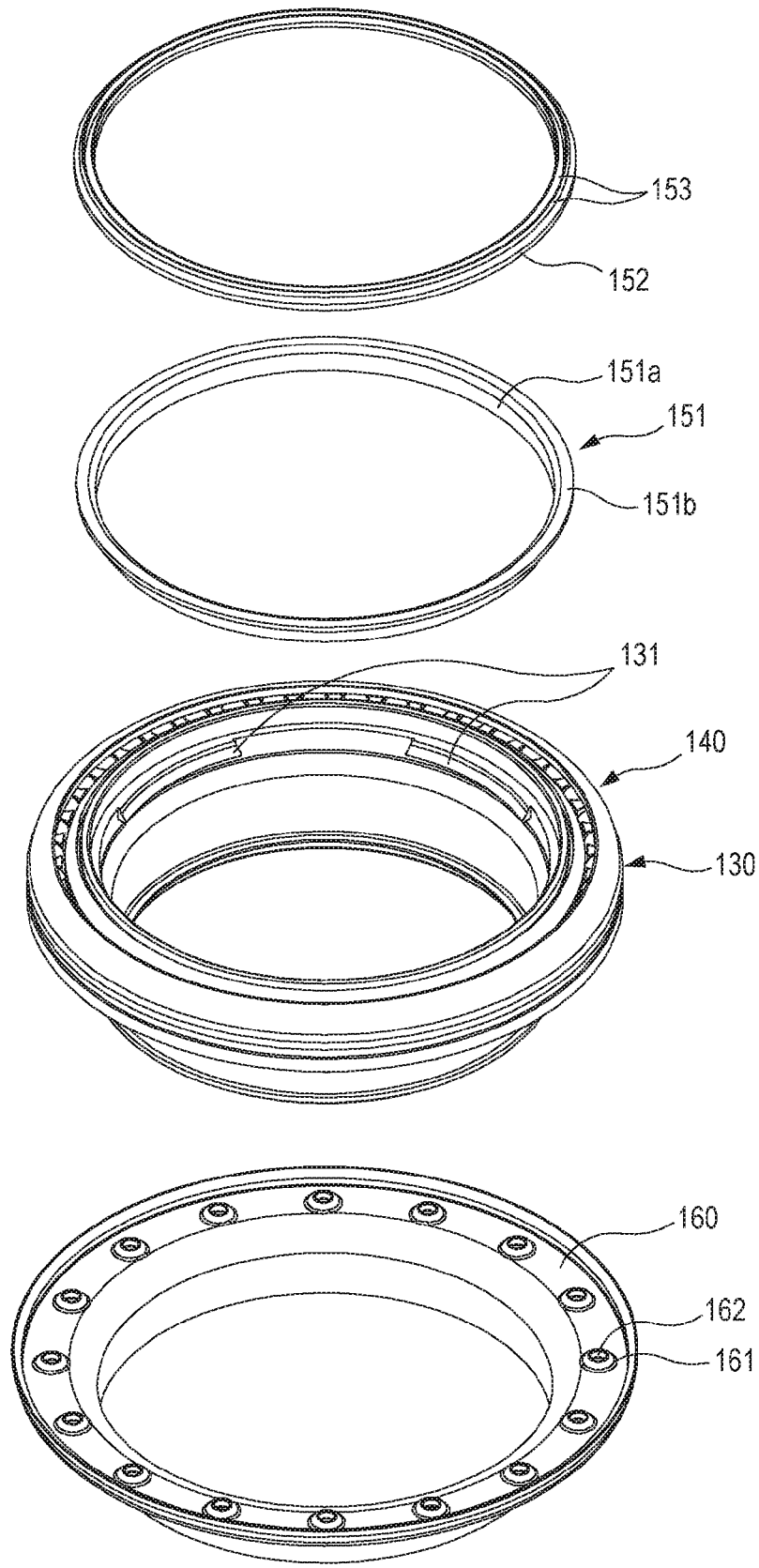
FIG. 7 is an exploded perspective view illustrating the lower housing and the bearing shown in FIG. 6.

FIG. 6 is a cross-sectional perspective view illustrating the lower housing and the bearing shown in FIG. 2. FIG. 7 is an exploded perspective view illustrating the lower housing and the bearing shown in FIG. 6.

The lower housing 130 is coupled to the upper housing 120 below the upper housing 120. In one embodiment, the lower housing 130 may comprise lower hook 131 engaged with the upper hook 126 of the upper housing 120, as shown in FIGS. 6 and 7. The lower hook 131 protrudes from an inner circumferential surface of the lower housing 130 in the radially inward direction IR. A plurality of lower hooks 131 may be intermittently formed in the circumferential direction. Alternatively, the lower hook may be continuously formed in the circumferential direction.

In one embodiment, the upper housing 120 and the lower housing 130 may be coupled to each other in a snap-fit method. For example, the upper hook 126 protruding in the radially outward direction OR and the lower hook 131 protruding in the radially inward direction IR are engaged with each other so that the upper housing 310 and the lower housing 320 are coupled each other.

In one embodiment, the lower housing 130 may comprise a bearing seat 132 for supporting the bearing 140. The bearing seat 132 extends from an outer circumferential surface of the lower housing 130 in the radially outward direction OR.

The bearing 140 is disposed between the upper housing 120 and the lower housing 130. In one embodiment, the bearing 140 may comprise an inner ring 141, an outer ring 142, a retainer 143, and a plurality of balls 144. The inner ring 141 is placed on the bearing seat 132. The outer ring 142 is spaced apart from the inner ring 141 and is rotated relative to the inner ring 141. A lower end of the extension 125 of the upper housing 120 is placed on an upper end of the outer ring 142. The retainer 143 is supported by the inner ring 141 and the bearing seat 132. The retainer 143 serves to maintain the plurality of balls 144 at predetermined intervals. The ball 144 may be supported by the retainer 143 and the inner ring 141 and may be rotated in the retainer 143.

Figure 8:
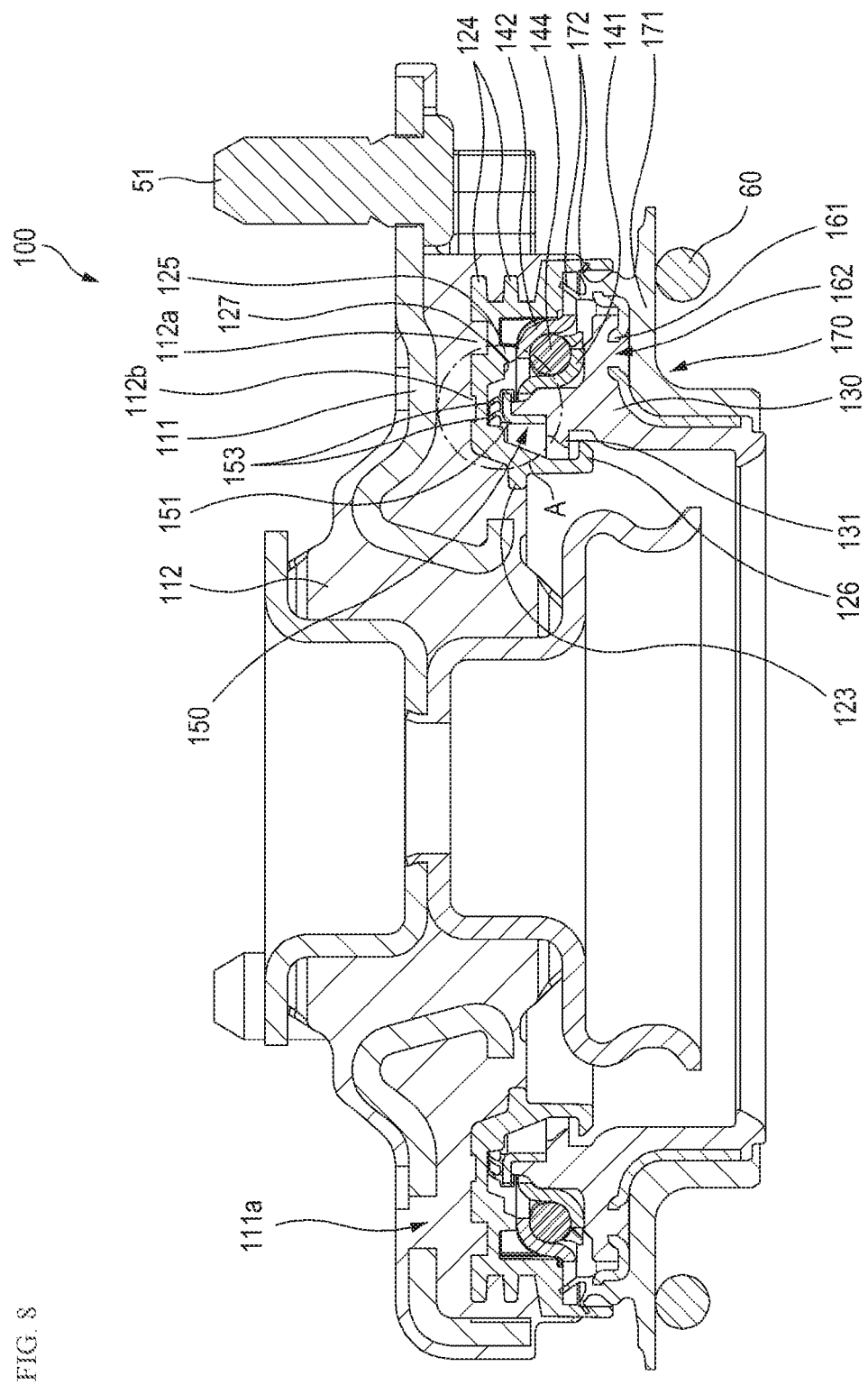
FIG. 8 is a cross-sectional view taken along line VIII-VIII shown in FIG. 1.
Figure 9:
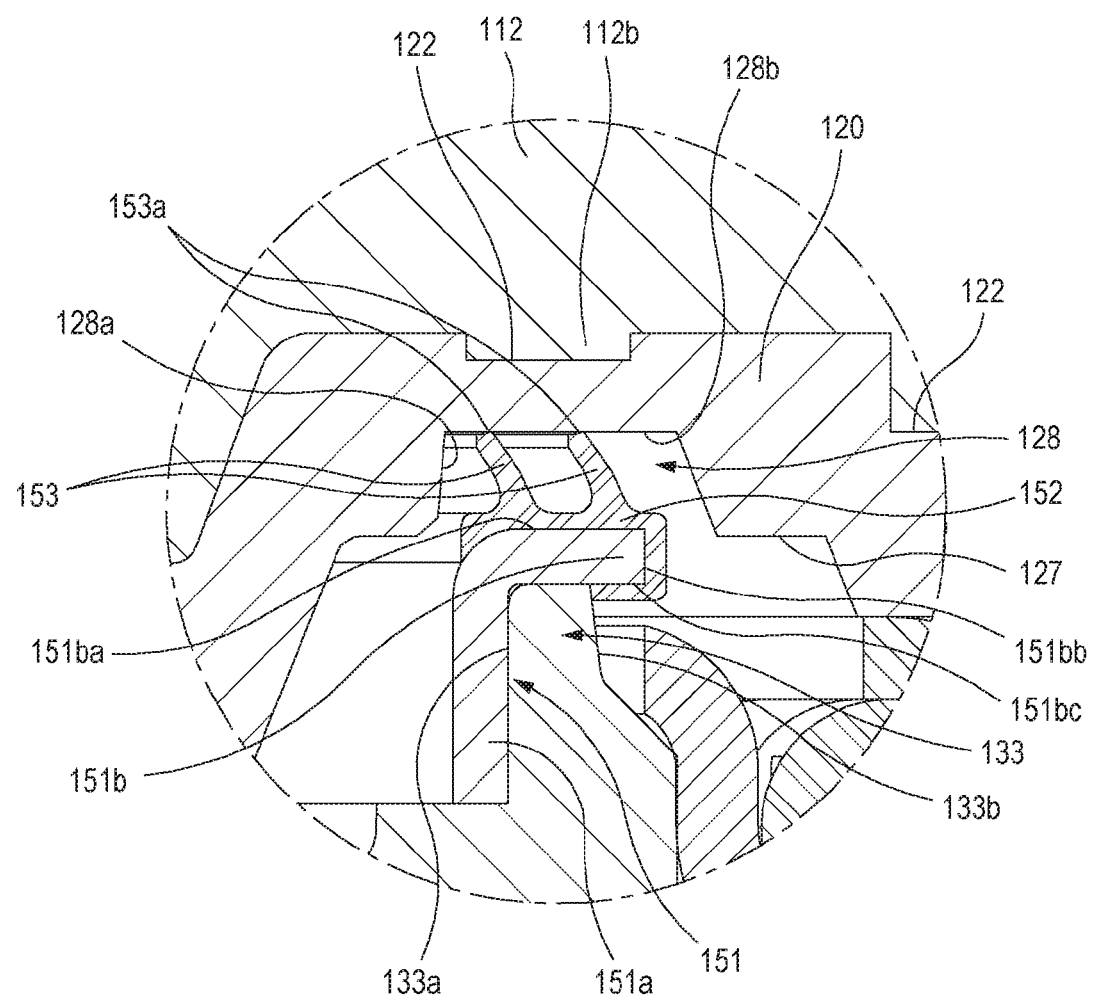
FIG. 9 is a partially enlarged view illustrating Portion "A" shown in FIG. 8.

FIG. 8 is a cross-sectional view taken along line VIII-VIII shown in FIG. 1. FIG. 9 is a partially enlarged view illustrating Portion "A" shown in FIG. 8.

As shown in FIGS. 8 and 9, the inner seal member 150 comprises a seal frame 151, a seal base portion 152 and a plurality of inner seal lips 153.

The seal frame 151 is coupled to an upper end portion 133 of the lower housing 130 in the radially inward direction of the bearing 140. The seal frame 151 may be manufactured by pressing a metal plate or metal pipe member. The seal frame 151 comprises a sleeve 151a coupled to the upper end portion 133 of the lower housing 130 and a flange 151b extending from an upper end of the sleeve 151a in the radially outward direction OR. The sleeve 151a has a hollow cylindrical shape. The sleeve 151a may be press-fit to an inner circumferential surface 133a of the upper end portion 133 of the lower housing 130. An outer circumferential surface of the sleeve 151a is in contact with the inner circumferential surface 133a of the upper end portion 133 so that the sleeve 151a is fixed and coupled to the lower housing 130. As shown in FIGS. 8 and 9, the flange 151b may extend substantially vertically from the sleeve 151a in the radially outward direction OR such that a longitudinal cross-sectional shape of the seal frame 151 has an L shape. In one embodiment, in a state in which the seal frame 151 is coupled to the lower housing 130, the flange 151b may protrude from an outer circumferential surface 133b of the upper end portion 133 of the lower housing 130 in the radially outward direction OR.

The seal base portion 152 is coupled to the flange 151b of the seal frame 151. The seal base portion 152 may be manufactured by vulcanizing a rubber material in a state of being coupled to an upper surface 151ba of the flange 151b through an adhesive. In one embodiment, the seal base portion 152 may be coupled to the seal frame 151 (i.e., the flange 151b) to surround a portion or an entirety of a lower surface 151bc of the flange 151b, a radial outer end 151bb of the flange 151b and the upper surface 151ba of the flange 151b. Accordingly, since an area in which the seal base portion 152 is bonded or coupled to the flange 151b is increased, a coupling force between the seal base portion 152 and the flange 151b may be enhanced. Consequently, it is difficult for the seal base portion 152 to be separated from the flange 151b and durability of the inner seal member 150 may be improved.

The inner seal lips 153 extend upward from the seal base portion 152. The upper end 153a of the inner seal lip 153 is disposed to be spaced apart from the inner sidewall 128a of the upper housing 120 and to be in contact with the lower surface 127 of the upper housing 120. In one embodiment, the upper end 153a of the inner seal lip 153 may be disposed to be spaced apart from the inner sidewall 128a of the groove 128 in the radially outward direction OR and to be in contact with the bottom wall 128b of the groove 128, as shown in FIG. 9. Accordingly, even when the upper housing 120 is moved relative to the lower housing 130 in the radially inward direction IR or the radially outward direction OR, the upper end 153a of the inner seal lip 153 may be still maintained in a state of being spaced apart from the inner sidewall 128a of the groove 128 and being in contact with the bottom wall 128b of the groove 128 and thus the seal performance between the upper housing 120 and the lower housing 130 may be not degraded. In one embodiment, a width of the groove 128 in the radial direction IR or OR may correspond to a width of the seal base portion 152 in the radial direction IR or OR. Therefore, foreign materials may be prevented from being introduced into the groove 128 so that the seal performance between the upper housing 120 and the lower housing 130 in the radially inward direction IR may be further improved.

The plurality of inner seal lips 153 may be disposed parallel to each other. The inner seal 153 may be disposed to be inclined from the seal base portion 152 in the radially inward direction IR. The inner seal lip 153 and seal base portion 152 may be integrally manufactured by vulcanizing a rubber material.

In one embodiment, the top mount assembly 100 may further comprise a spring pad frame 160 integrally coupled to the lower housing 130, as shown in FIG. 7. The spring pad frame 160 is disposed on the outer circumferential surface of the lower housing 130. The spring pad frame 160 reinforces rigidity of the lower housing 130 and indirectly supports an upper end of a spring 60 which is disposed therebelow. The spring pad frame 160 may be made of a metal plate, e.g., a hot-rolled steel plate. During the molding of the lower housing 130, the spring pad frame 160 may be integrally maintained with the lower housing 130 by injecting a plastic material in a state in which the spring pad frame 160 is fixed to the mold.

In one embodiment, the spring pad frame 160 may include a plurality of convex portions 161 which are arranged in the circumferential direction CD and are convex upward. Accordingly, an area in which the lower housing 130 is in contact with the spring pad frame 160 may be increased and a coupling force between the lower housing 130 and the spring pad frame 160 may be enhanced. In one embodiment, the spring pad frame 160 may comprise a plurality of holes 162 arranged in the circumferential direction CD. The plurality of holes 162 may be formed on the plurality of convex portions 161. The plastic injection of the lower housing 130 fills in the plurality of holes 162 so that the coupling force between the lower housing 130 and the spring pad frame 160 may be further enhanced. Alternatively, the convex portions and the holes may be alternately disposed in the circumferential direction.

In one embodiment, the top mount assembly 100 may further comprise a spring pad 170 integrally coupled to the spring pad frame 160 at the outside of the spring pad frame 160. At least a portion of the spring pad 170 may be disposed between the upper housing 120 and the lower housing 130 in the radially outward direction OR of the bearing 140 to seal between the upper housing 120 and the lower housing 130. The spring pad 170 may be made of a rubber material. The spring pad 170 may be manufactured by vulcanizing a rubber material in a state of being coupled to an outer circumferential surface of the spring pad frame 160 through an adhesive.

In one embodiment, the spring pad 170 may comprise a seat part 171 and outer seal lip 172. The seat part 171 and the outer seal lip 172 may be manufactured by vulcanizing a rubber material in a state in which the spring pad 170 is coupled to the outer circumferential surface of the spring pad frame 160. The seat part 171 extends in the radially outward direction OR and directly supports the spring 60 which is disposed therebelow. The seat part 171 may prevent noise due to rubbing between the lower housing 130 (or the spring pad frame 160) and the spring 60 and suppress transfer of an impact or a vibration from the spring 60 to the lower housing 130 (or the spring pad frame 160). The outer seal lip 172 is integrally formed with the seat part 171 on the seat part 171 and seals between the upper housing 120 and the lower housing 130 in the radially outward direction OR of the bearing 140. A plurality of outer seal lips 172 may be formed to be in contact with a lower surface of the upper housing 120.

Figure 10:
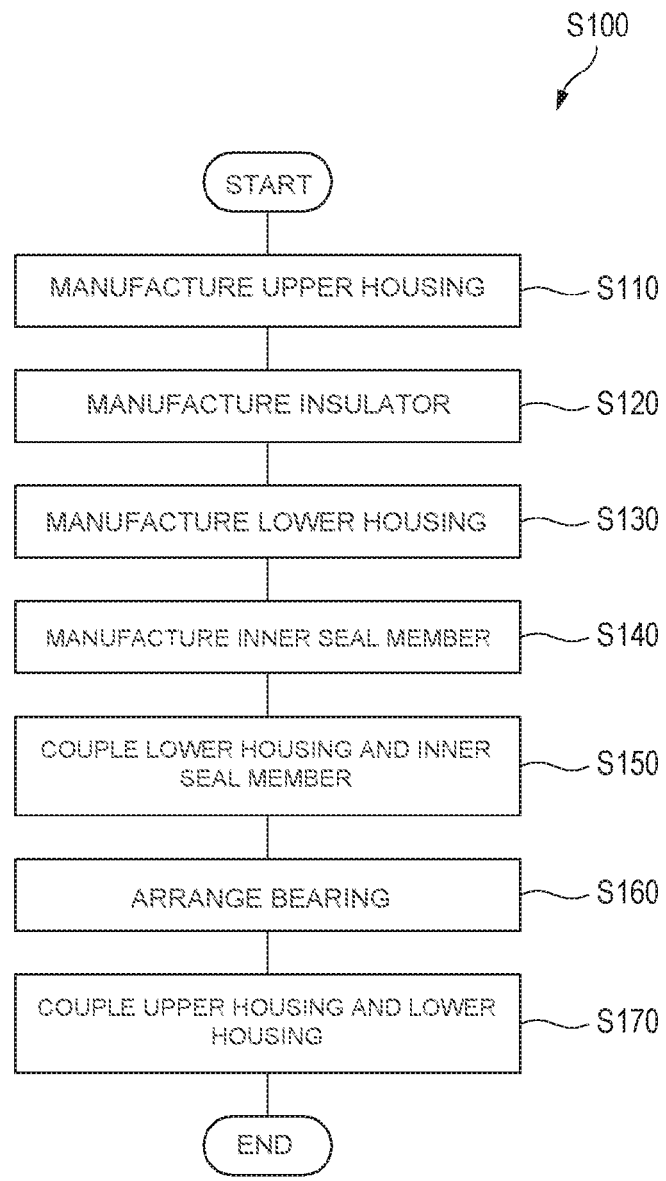
FIG. 10 is a flowchart illustrating a method of manufacturing a top mount assembly according to one embodiment of the present disclosure.

FIG. 10 is a flowchart illustrating a method of manufacturing a top mount assembly according to one embodiment of the present disclosure.

Although the process operations, the method operations, the algorithms, and the like are described in a sequential order in the flowcharts shown in FIG. 10, such processes, methods, and algorithms may be configured to operate in any appropriate order. In other words, the operations of the processes, methods, and algorithms described in various embodiments of the present disclosure need not be performed in the order described in the present disclosure. Further, although some operations are described as being performed asynchronously, these some operations may be performed simultaneously in some embodiments. Furthermore, illustration of the process shown in the drawings does not mean that the illustrated process excludes other alternations and modifications thereto, and it does not mean that the illustrated process or any among operation thereof is essential to one or more among the various embodiments of the present disclosure and does not mean that the illustrated process is preferred.

Referring to FIG. 10, a method of manufacturing a top mount assembly according to one embodiment of the present disclosure S100 comprises manufacturing an upper housing S110, manufacturing an insulator S120, manufacturing a lower housing S130, manufacturing an inner seal member S140, coupling the lower housing and the inner seal member S150, arranging a bearing S160, and coupling the upper housing and the lower housing S170. Since the detailed configurations and functions of the top mount assembly 100 have been specifically described with reference to the embodiments shown in FIGS. 1 to 9, detailed descriptions thereof will be omitted below.

In the manufacturing of the upper housing S110, the upper housing 120 comprises the first and second concave portions 121 and 122 formed by injection molding. In one embodiment, the groove 128 which is concave upward may be formed on the lower surface 127 of the upper housing 120.

In the manufacturing of the insulator S120, the insulator 110 is manufactured to be integrally coupled to the upper housing 120 such that the elastic body 112 comprises the first and second protrusions 112a and 112b, In one embodiment, in the manufacturing of the insulator S120, the insulator 110 may be manufactured to be integrally coupled to the upper housing 120 by insert vulcanizing.

In the manufacturing of the lower housing S130, the lower housing 130 is manufactured to be couplable to the upper housing 120.

In the manufacturing of the inner seal member S140), the inner seal member 150 is manufactured to comprise the seal frame 151, the seal base portion 152, and the inner seal lip 153. In the manufacturing of the inner seal member S140, the seal frame 151 comprises the sleeve 151a and the flange 151b. The upper end 153a of the inner seal lip 153 may be disposed to be spaced apart from the inner sidewall 128a of the upper housing 120 and to be in contact with the lower surface 127 of the upper housing 120.

In one embodiment, in the manufacturing of the inner seal member S140, the seal base portion 152 may be disposed to be coupled to the flange 151b and the upper end 153a of the inner seal lip 153 may be disposed to be spaced apart from the inner sidewall 128a of the groove 128 and to be in contact with the bottom wall of the groove 128. In one embodiment, in the manufacturing of the inner seal member S140, a width of the groove 128 in the radial direction IR or OR may correspond to a width of the seal base portion 152 in the radial direction IR or OR. Upper ends 153a of a plurality of inner seal lips 153 may be disposed to be in contact with a portion of the lower surface 127 of the upper housing 120.

In one embodiment, in the manufacturing of the inner seal member S140, the flange 151b may protrude from an outer circumferential surface 133b of the upper end portion 133 of the lower housing 130 in the radially outward direction. In one embodiment, the manufacturing of the inner seal member S140, the seal base portion 152 may be coupled to the seal frame 151 to surround a portion or an entirety of the lower surface 151bc of the flange 151b, the radial outer end 151bb of the flange 151b and the upper surface 151ba of the flange 151b.

In the coupling of the lower housing and the inner seal member S150, the inner seal member 150 is coupled to an upper end portion of the lower housing 130. In one embodiment, in the coupling of the lower housing and the inner seal member S150, the sleeve 151a may be press-fitted to the inner circumferential surface 133a of the upper end portion 133 of the lower housing 130.

In the arranging of the bearing S160, the bearing 140 is disposed between the upper housing 120 and the lower housing 130 in the radially outward direction OR of the inner seal member 150.

In the coupling of the upper housing and the lower housing S170, the lower housing 130 is coupled below the upper housing 120.

In one embodiment, the method of manufacturing a top mount assembly S100 may further comprise insert injection molding the spring pad frame 160 integrally coupled to the lower housing 130.

In one embodiment, the method of manufacturing a top mount assembly S100 may further comprise insert vulcanizing the spring pad 170 to be coupled to the outside of the spring pad frame 160.

Although the technical spirit of the present disclosure has been described by way of some embodiments and examples shown in the accompanying drawings, it should be noted that various substitutions, modification, and alterations can be devised by those skilled in the art to which the present disclosure pertains without departing from the technical spirit and scope of the present disclosure. Further, it should be construed that these substitutions, modifications, and variations are included within the scope of the appended claims.

What is claimed is:

1. A top mount assembly comprising:
an insulator coupled to a vehicle body;
an upper housing integrally coupled to the insulator below the insulator;
a lower housing coupled to the upper housing;
a bearing disposed between the upper housing and the lower housing; and
an inner seal member comprising a seal frame coupled to an upper end portion of the lower housing in a radially inward direction of the bearing; a seal base portion coupled to the seal frame; and a plurality of inner seal lips extending upward from the seal base portion,
wherein the seal frame comprises a sleeve coupled to the upper end portion of the lower housing; and a flange extending from an upper end of the sleeve in a radially outward direction,
wherein the seal base portion is coupled to the seal frame to surround an upper surface of the flange, a radial outer end of the flange, and a portion or all of a lower surface of the flange,
wherein a groove which is concave upward is formed on the lower surface of the upper housing, and
wherein the inner seal lips are disposed to be spaced apart from an inner sidewall of the groove and to be in contact with only a bottom wall of the groove.

2. The top mount assembly of claim 1, wherein a width of the groove in a radial direction corresponds to a width of the seal base portion in the radial direction.

3. The top mount assembly of claim 1, wherein the sleeve is press fitted to an inner circumferential surface of the upper end portion of the lower housing.

4. The top mount assembly of claim 1, wherein the flange protrudes from an outer circumferential surface of the upper end portion of the lower housing in the radially outward direction.

5. The top mount assembly of claim 1, wherein the upper housing is integrally coupled to the insulator by insert vulcanizing.

6. The top mount assembly of claim 1, wherein the upper housing comprises a plurality of concave portions intermittently disposed on an upper surface thereof in a circumferential direction.

7. The top mount assembly of claim 1, wherein the upper housing comprises at least one of an inner flange extending from an inner circumferential surface thereof in the radially inward direction and an outer flange extending from an outer circumferential surface thereof in the radially outward direction.

8. The top mount assembly of claim 1, further comprising:
a spring pad frame integrally coupled to the lower housing.

9. The top mount assembly of claim 8, further comprising:
a spring pad integrally coupled to the spring pad frame at the outside of the spring pad frame,
wherein at least a portion of the spring pad is disposed between the upper housing and the lower housing in the radially outward direction of the bearing to seal between the upper housing and the lower housing.

10. The top mount assembly of claim 9, wherein the spring pad comprises:
a seat part extending in the radially outward direction; and
a plurality of outer seal lips integrally formed with the seat part thereon and configured to seal between the upper housing and the lower housing.

11. A method of manufacturing a top mount assembly, comprising:

manufacturing an upper housing;

manufacturing an insulator which is integrally coupled to the upper housing;

manufacturing a lower housing coupled to the upper housing;

manufacturing an inner seal member comprising a seal frame coupled to an upper end portion of the lower housing; a seal base portion coupled to the seal frame; and a plurality of inner seal lips extending upward from the seal base portion;

coupling the inner seal member to the upper end portion of the lower housing;

arranging a bearing between the upper housing and the lower housing in a radially outward direction of the inner seal member; and coupling the lower housing to the upper housing, wherein the seal frame comprises a sleeve coupled to the upper end portion of the lower housing; and a flange extending from an upper end of the sleeve in a radially outward direction, wherein in the manufacturing of the housing, a groove which is concave upward is formed on the lower surface of the upper housing, and wherein in the manufacturing of the inner seal member, the seal base portion is coupled to the seal frame to surround an upper surface of the flange, a radial outer end of the flange, and a portion or all of a lower surface of the flange, and the inner seal lips are disposed to be spaced apart from an inner sidewall of the groove and to be in contact with only a bottom wall of the groove.

12. The method of claim 11, wherein a width of the groove in a radial direction corresponds to a width of the seal base portion in the radial direction.

13. The method of claim 11, wherein, in the coupling of the inner seal member to the upper end portion of the lower housing, the sleeve is press fitted to an inner circumferential surface of the upper end portion of the lower housing.

14. The method of claim 11, wherein, in the manufacturing of the inner seal member, the flange protrudes from an outer circumferential surface of the upper end portion of the lower housing in the radially outward direction.

15. The method of claim 11, wherein, in the manufacturing of the insulator, the insulator is manufactured to be integrally coupled to the upper housing by insert vulcanizing.

* * * * *